United States Patent [19]
Hamada et al.

[11] Patent Number: 5,574,500
[45] Date of Patent: Nov. 12, 1996

[54] VIDEO QUALITY EVALUATING EQUIPMENT FOR REPRODUCED IMAGE OF VIDEO SIGNAL SUBJECT TO DIGITAL COMPRESSION

[75] Inventors: Takahiro Hamada, Saitama; Shuichi Matsumoto, Tokyo, both of Japan

[73] Assignee: Kokusai Denshin Denwa Kabushiki Kaisha, Japan

[21] Appl. No.: 542,356

[22] Filed: Oct. 12, 1995

[30] Foreign Application Priority Data

Jan. 20, 1995 [JP] Japan .................................. 7-024486

[51] Int. Cl.$^6$ .................................................. H04N 17/00
[52] U.S. Cl. ............................................ 348/180; 348/395
[58] Field of Search ................................ 348/384, 395, 348/180, 189, 192; 382/248; H04N 17/00

[56] References Cited

U.S. PATENT DOCUMENTS

| | | | |
|---|---|---|---|
| 4,953,019 | 8/1990 | Skikakura et al. | 348/384 |
| 5,051,827 | 9/1991 | Fairhurst | 348/180 |
| 5,499,050 | 3/1996 | Baldes et al. | 348/180 |

*Primary Examiner*—Victor R. Kostak
*Attorney, Agent, or Firm*—Westman, Champlin & Kelly, P.A.

[57] ABSTRACT

A sync controller 14 controls an amount of delay of a delay part 15 so that original video data entered from a video source 1 is synchronized with reproduced video data which is compressed and reproduced by a system to be evaluated. A first OT calculator 17 orthogonally transforms a reproduced image, a second OT calculator 21 orthogonally transforms an original image and a subtractor 19 obtains a difference value of the same order coefficients in one block. A WSNR calculator 22 weights the difference with a weighting function which varies with a position of a coefficient of orthogonally transformed data and a magnitude of an AC power in the block after orthogonal transform of the original image and subsequently obtains an average weighted S/N ratio of each video frame or a plurality of video frames. Finally, a subjective evaluation value calculator 23 calculates a subjective evaluation value (deterioration percentage) according to the average weighted S/N ratio. Consequently, the present invention enables to provide a video quality evaluating equipment for a reproduced image of a video signal subject to digital compression capable of economically evaluating the video quality in a short period of time.

6 Claims, 6 Drawing Sheets

$$S = \frac{1}{Bc \cdot M \cdot N} \sum_{c=1}^{T} \sum_{b=1}^{Bc} \left( \sum_{m=0}^{M} \sum_{n=0}^{N} y_c^2 (bc, m, n) - \sum_{(m,n) \in D} y_c^2 (bc, m, n) \right) \quad \text{Eq. 1}$$

$$q^2 = \frac{1}{Bc \cdot M \cdot N} \sum_{c=1}^{T} \sum_{b=1}^{Bc} \sum_{m=D}^{M} \sum_{n=D}^{N} h_c^2 (\sigma_c^2 (bc), m, n) \cdot (x_c (bc, m, n) - y_c (bc, m, n))^2 \quad \text{Eq. 3}$$

WHERE $$\sigma_c^2 (bc) = \sum_{c=1}^{T} \left( \sum_{m=0}^{M} \sum_{n=0}^{N} x_c^2 (bc, m, n) - \sum_{(m,n) \in D} x_c^2 (bc, m, n) \right)$$

$$h_c (\sigma_c^2 (bc), m, n) = \frac{2.6 \, (0.192 + 0.114 \, g) \exp(-(0.114 \, g)^{1.1})}{A^2(m) \, A^2(n) \, \sqrt{2.02 \log_{10} (\sigma_c^2 (bc))}} \quad \text{Eq. 4}$$

WHERE $$g = \begin{cases} 5.235 \sqrt{(m/0.890)^2 + n^2} & (c = 1) \\ 5.235 \sqrt{(m/2/0.890)^2 + n^2} & (c = 2, 3) \end{cases}$$

$A(0) = 1/\sqrt{2}, \quad A(m) = A(n) = 1 \quad (m \neq 0, n \neq 0)$ $T = 3, \quad M = N = 7$ $D : (m, n) = (0, 0)$ Eq. 5

(TEST DATA AND THEIR CHARACTERISTICS)

| DATA 1 | A HORIZONTAL PANNING VIDEO IMAGE INCLUDING LARGELY EDGE AND SATURATED COLOR AS WELL AS FLAT PORTION |
|---|---|
| DATA 2 | WITH A BLACK BACKGROUND, AN OBJECT OF SATURATED COLOR IS SUBJECT TO HORIZONTAL PANNING AND CAMERA FLASH. |
| DATA 3 | ALMOST STATIONARY IMAGE INCLUDING A GREATER PART OF FLAT PORTION, EXCEPT SOME PRECISE PORTIONS. |
| DATA 4 | THOUGH THE CAMERA IS STATIONARY, A PLURALITY OF OBJECTS MOVE VERTICALLY AND HORIZONTALLY. |
| DATA 5 | THE WHOLE IMAGE IS FORMED WITH LINES IN SATURATED COLOR AND IS SUBJECT TO HORIZONTAL PANNING. |
| DATA 6 | A FEW EDGES MOVE IRREGULARLY IN A STATIONARY BACKGROUND. |
| DATA 7 | A GREATER PART OF THE IMAGE IS FORMED WITH PRECISE PORTIONS IN SATURATED COLOR AND ALMOST STATIONARY. |
| DATA 8 | MANY EDGES ROTATE AND MOVE IN THE BLACK BACKGROUND. |
| DATA 9 | CHARACTERS ARE SCROLLED HORIZONTALLY AND VERTICALLY IN A FLAT BACKGAROUND. |

VIDEO QUALITY EVALUATING EQUIPMENT FOR REPRODUCED IMAGE OF VIDEO SIGNAL SUBJECT TO DIGITAL COMPRESSION

BACKGROUND OF THE INVENTION

1. Field of the Invention

The present invention relates to a video quality evaluating equipment for a reproduced image of a video signal subject to digital compression and, more particularly, a video quality evaluating equipment for a reproduced image of a video signal subject to digital compression capable of local evaluation of a digital TV codec image or a transmitted coded image.

2. Description of the Prior Art

A technique for compressing image data has been developed to transmit image data such as a TV image in a less volume of information. A quality of an image data compression apparatus greatly affects a transmission quality of image data and therefore, for forming a transmission system, it is necessary to accurately evaluate the video quality of the image data compression apparatus and select an excellent video data compression apparatus for actual use.

Generally, for video quality evaluation of digital TV codec images, an experiment for subjective evaluation has been carried out for several days by actually using more than ten persons to be tested according to, for example, a recommendation of the ITU-R.

However, the above subjective evaluation experiment includes a problem that an extremely large working volume is needed in the experiment and high costs are required for the experiment even in a case of evaluation of a small number of images. In addition, the subjective evaluation includes a problem that the experiment requires a lot of time and the video quality evaluation of the digital TV codec images cannot be carried out in a short period of time.

SUMMARY OF THE INVENTION

An object of the present invention made in view of the problems of the prior art is to provide a video quality evaluating equipment for a reproduced image of a video signal subject to digital compression capable of economical video quality evaluation in a short period of time.

For achieving the above-described object, the present invention is characterized in that the video quality evaluating equipment for the reproduced image of the video signal subject to digital compression according to the present invention comprises means for synchronizing original video data with reproduced video data obtained by reproducing the original video data after compressing the original video data, means for orthogonally transforming a block of the original video data and the reproduced video data which are synchronized, means for calculating a difference of the same order coefficients of the orthogonally transformed video data, means for weighting the difference with a weighting function, which varies with a position of the coefficient of the above orthogonally transformed data and a magnitude of an AC power in the block after orthogonal transform in the original image and subsequently obtaining an average weighted S/N ratio for each video frame or a plurality of video frames, and means for obtaining a value of subjective evaluation by using the weighted S/N ratio.

Also, the video quality evaluating equipment for the reproduced image of the video signal subject to digital compression according to the present invention is characterized in that the video quality evaluating equipment comprises means for orthogonally transforming reproduced video data, a statistics calculator for obtaining a mean value of AC power for one video frame from the video data which is orthogonally transformed, a table means for storing a correlation of the mean value of AC power and the average weighted S/N ratio, obtaining the weighted S/N ratio based on the mean value of AC power from the statistics calculator and outputting it, and a subjective evaluation value calculator for calculating the value of subjective evaluation according to the average weighted S/N ratio from the table means.

According to the present invention, the original video data is synchronized with the reproduced video data obtained by reproducing the original video data which has been compressed and a difference value of both video data after orthogonal transform is obtained. Subsequently, this difference value is weighted with the weighting function which varies with the magnitude of the AC power in the block and then the average weighted S/N ratio for each video frame or a plurality of video frames is obtained. Next, the subjective evaluation value is obtained by using the average weighted S/N ratio. Accordingly, the present invention enables to quickly implement economical subjective evaluation of the reproduced video data without requiring manpower.

The video quality evaluating equipment according to the present invention is provided with the table means for storing a correlation of the mean value of AC power and the average weighted S/N ratio and therefore the mean value of AC power is obtained from the orthogonal transform data of the reproduced video data and an average weighted S/N ratio corresponding to the mean value of AC power is obtained by applying the correlation data of the table means to the mean value of AC power. The subjective evaluation value is obtained by using the average weighted S/N ratio. Accordingly, the subjective evaluation of the reproduced video data can be made without using the original signals and subjective evaluation can be made on the reproduced video data transmitted from a foreign country.

DETAILED DESCRIPTION OF THE PREFERRED EMBODIMENT

Figure 1:
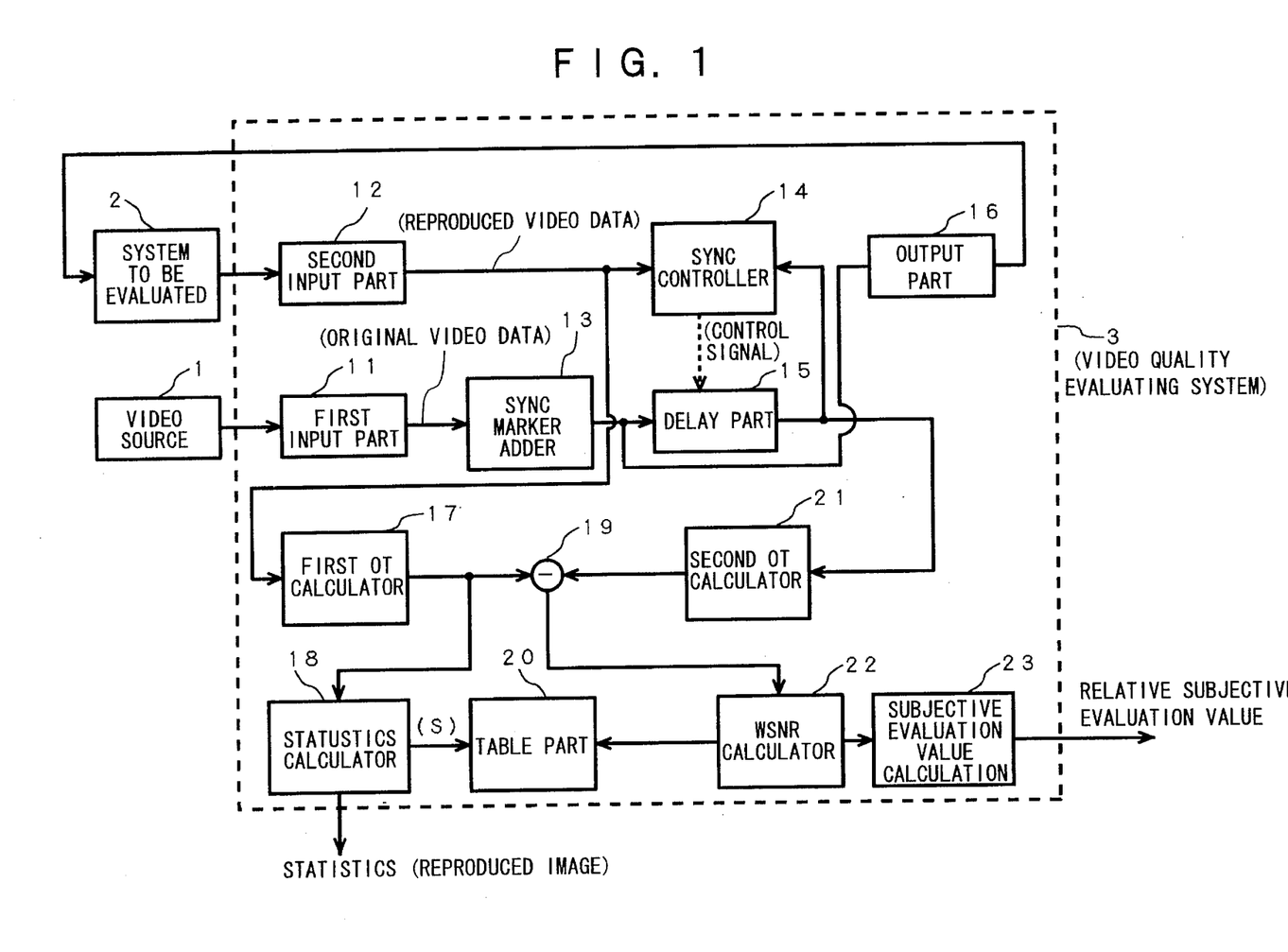
FIG. 1 is a block diagram showing a construction of an embodiment according to the present invention.

The present invention is described in detail referring to the drawings. Referring to FIG. 1, a configuration and operation of a video quality evaluating system of an embodiment of the present invention.

In FIG. 1, reference numeral 1 is a video source such as a composite TV signal and a component TV signal, numeral 2 is a system to be evaluated which is an item to be tested, and numeral 3 is a video quality evaluating system. The video quality evaluating system 3 comprises a first input part 11 into which the video source is entered, a second input part 12 into which the output signal of the system to be evaluated 2 is entered, a sync marker adder 13, a sync controller 14, a delay part 15, an output part 16, a first OT (for example, DCT/WHT) calculator 17, a statistics calculator 18, a subtractor 19, a table part 20, a second OT (for example, DCT/WHT) calculator 21, a WSNR calculator 22, and a subjective evaluation value calculator 23. In this case, WHT denotes the Hadamard transform which is one of orthogonal transforms and WSNR (Weighted Signal to Noise Ratio) denotes a weighted S/N ratio.

The original video data such as the composite TV signals or the component TV signals from the video source 1 are entered as digital data into the first input part 11. If the video source 1 is one for the composite TV signal, there are the signals of one channel and, if the video source 1 is one for the component TV signal, there are the signals of three channels. If the signals from the video source 1 are analog signals, the first input part 11 outputs the signals to the sync marker adder after A/D conversion.

The sync marker adder 13 adds the sync marker to the digital data entered. The digital data to which the sync marker is added is transmitted to the system to be evaluated 2 through the output part 16. The system to be evaluated 2 is the digital TV codec which is an item to be tested, and decodes the digital data entered after encoding it, then enters decoded data into the second input part 12. The second input part 12 digitizes the decoded data and outputs it. The reproduced video data outputted from the second input part 12 is entered into the sync controller 14 and sent to the first OT calculator 17. The sync controller 14 controls a delay amount of the delay part 15 so that the original video data delayed by the delay part 15 coincides with the marker of the reproduced video data. This delay amount accounts for, for example, one frame or a few frames. Consequently, the reproduced video data to be entered into the first OT calculator 17 and the original video data to be entered into the second OT calculator 21 can be accurately synchronized.

If the original image is formed with composite TV signals, it is preferable to carry out WHT transform for each block in the first and second OT calculators 17 and 21. On the other hand, if the original image is formed with component TV signals, it is preferable to carry out DCT transform for each block in the first and second OT calculators 17 and 21.

The subtractor 19 calculates a difference value of the same order coefficients. Parallel with this calculation, the statistics calculator 18 calculates the statistics S of the reproduced image from the output of the first OT calculator 17. Base on the difference value obtained from the subtractor 19 the WSNR calculator 22 calculates the WSNR (Weighted Signal to Noise Ratio) on which the human visual characteristic is reflected. This WSNR is transformed to a relative subjective evaluation value by the subjective evaluation value calculator 23. Simultaneously, the table part 20 prepares the correspondence of the statistics S obtained from the statistics calculator 18 and the WSNR obtained from the WSNR calculator 22.

Figure 2:
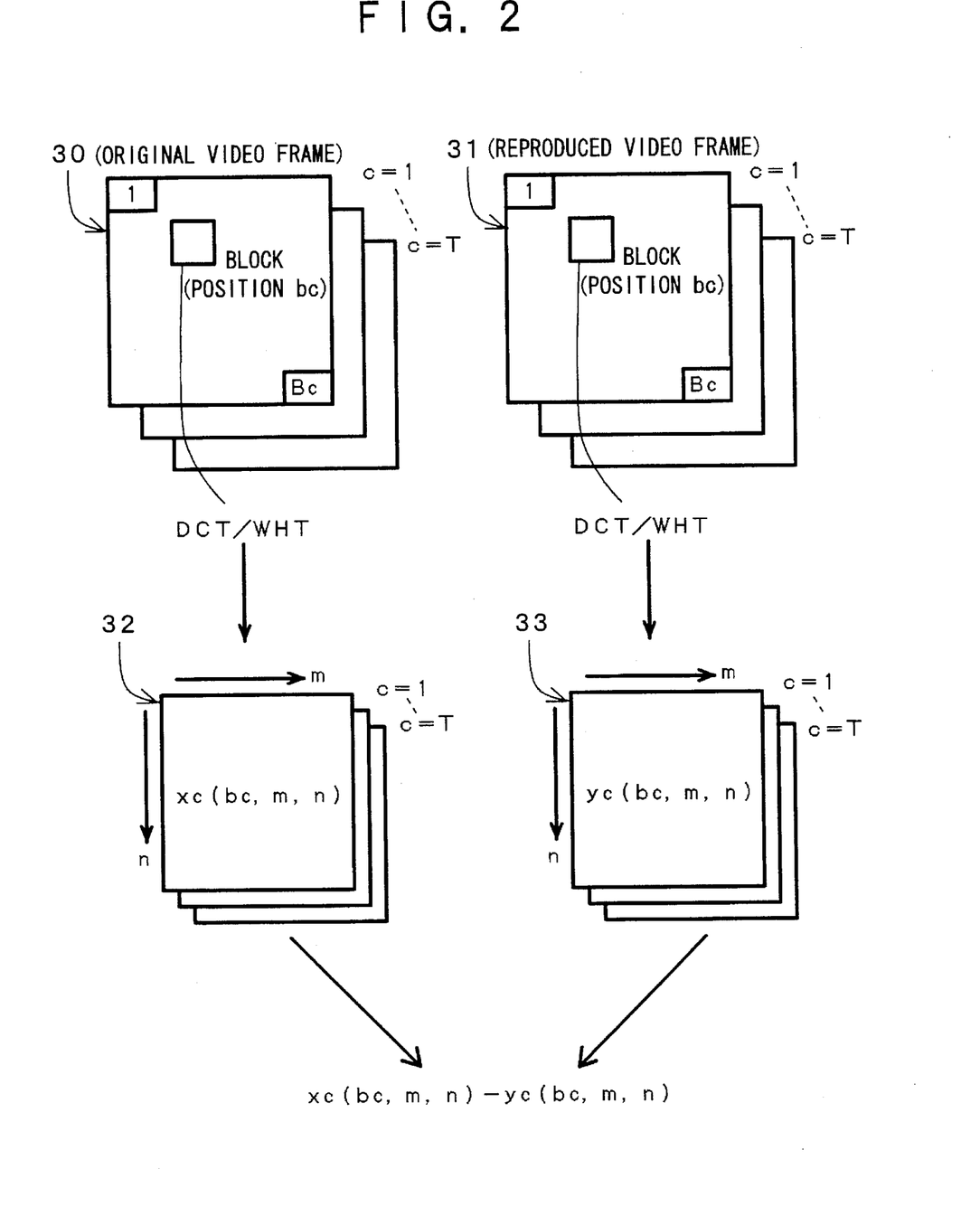
FIG. 2 is a schematic diagram of operation of part of FIG. 1.

The operation of the first and second OT calculators 17 and 21 and the subtractor 19 are described referring to FIG. 2. In FIG. 2, reference numeral 30 is an original video frame to be entered into the first OT calculator 17 and numeral 31 is a reproduced video frame to be entered into the second OT calculator 21. In these drawings, c is a number of frames; c=1 is given if the original image is formed with composite TV signals and c=3 is given if the original image is formed with composite TV signals. In other words, T=1 is given in the former case and T=3 is given in the latter case. The first OT calculator 17 carries out orthogonal transform of all pixels of the original video frame 30 for each block. Numeral 32 is a coefficient xc (bc, m, n) obtained after orthogonal transform, where bc is a position of the block in the original video frame, m is the number of the main scanning direction, and n is the number of the sub scanning direction. On the other hand, the second OT calculator 21 carries out orthogonal transform of all pixels of the original video frame 31 for each block. Numeral 33 is a coefficient yc (bc, m, n) obtained after orthogonal transform.

The subtractor 19 calculates a difference value of the same order coefficients outputted from the first and second OT calculators 17 and 21. This difference value is xc (bc, m, n)–yc (bc, m, n).

Figure 3:
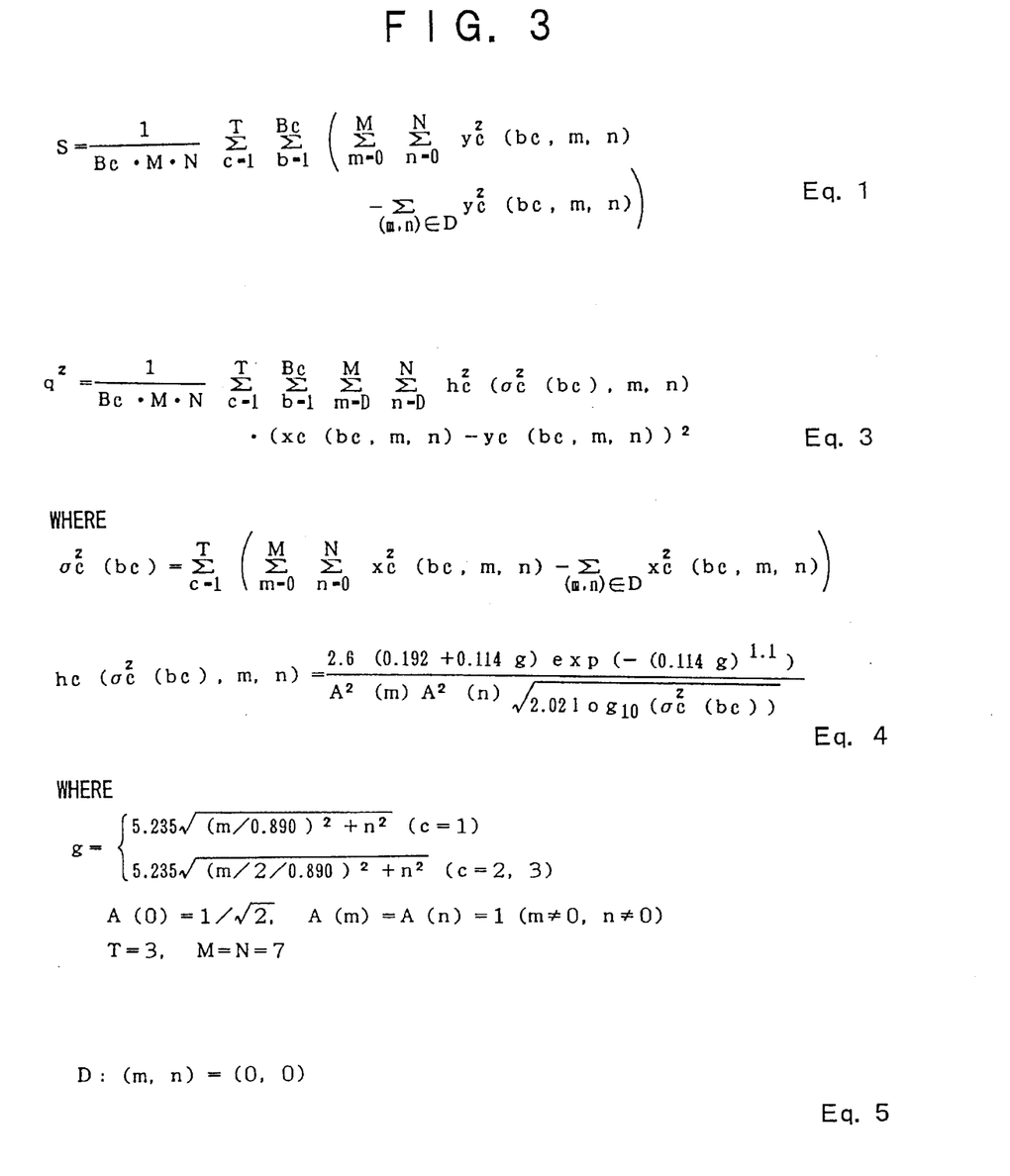
FIG. 3 is a diagram showing equation 1 and equations 3 to 5.

Parallel with the above operation, the statistics calculator 18 calculates the statistics S of the reproduced image from the equation 1 shown in FIG. 3, where Bc is the total number of blocks in one frame, M is a total number of pixels in the main scanning direction of the corresponding block, N is a total number of pixels in the sub scanning direction of the corresponding block, and D is a position of the DC component. In other words, the second equation in brackets of the right-side term of equation 1 indicates a coefficient of the DC component.

Accordingly, the statistics S denotes the mean value of AC power of the reproduced image of one frame.

The following describes the operation of the WSNR calculator 22. The average weighted S/N ratio (WSNR) is obtained from the equation 2 given below.

$$\text{WSNR} = 10 \log 255^2/q^2 \qquad \text{Eq. 2}$$

where, q2 denotes the average weighted noise of one frame which can be represented by the equation 3 shown in FIG. 3. Each pixel of a TV signal is represented by 8 bits and therefore 255 which is the peak value is a value of the numerator of the equation 2.

Term $hc^2(\sigma c^2(bc), m, n)$ in the equation 3 denotes the visual sensitivity at respective positions in one block, and $\sigma c^2$ denotes the total sum of AC power in the block bc. In other words, $\sigma c^2$ denotes a degree of a noise masking effect.

Figure 4:
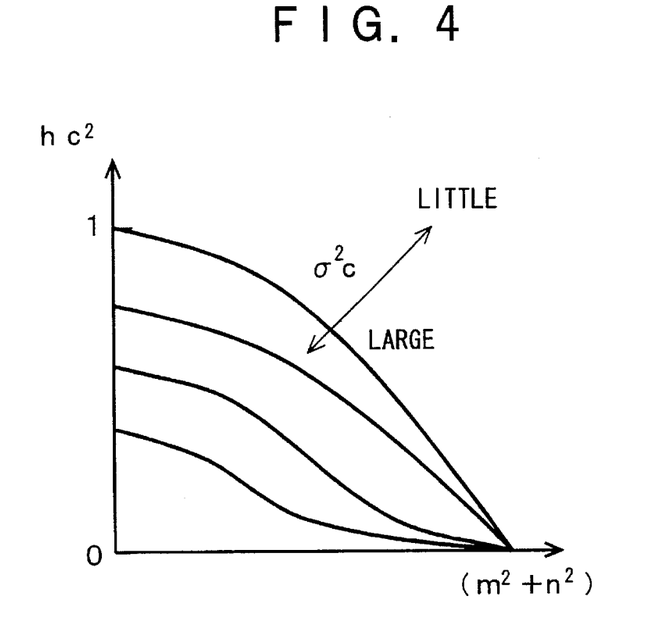
FIG. 4 is a characteristic diagram of a visual sensitivity characteristic hc.

Generally, the human visual sensitivity is large to images such as a trunk of a tree and thick branches of the tree which are almost stationary and small to those images such as leaves of the tree which are moved largely and frequently. Accordingly, if $hc^2$ is plotted on the vertical axis and $m^2+n^2$ is plotted on the horizontal axis, $hc^2$ tends to take a value approximate to 1 if $m^2+n^2$ is small and a value approximate to 0 if $m^2+n^2$ is large as shown in FIG. 4. If $\sigma c^2$ is small, the visual sensitivity is large and, if $\sigma c^2$ is large, the visual sensitivity is small.

In this case, the equations 4 and 5 shown in FIG. 3 can be given as an example representation of the visual sensitivity hc and the position D of the DC component in component TV signals.

Figure 5:
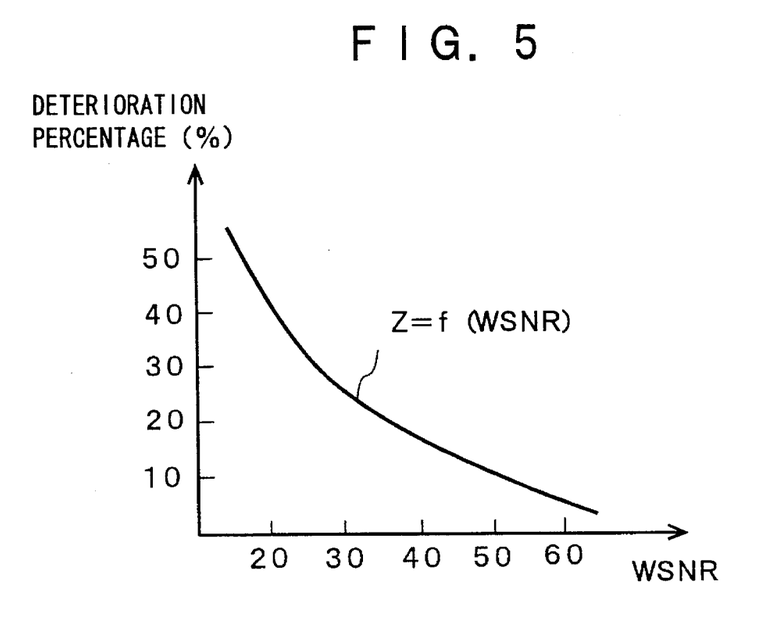
FIG. 5 is a characteristic diagram showing a relationship between the subjective evaluation value (degree of deterioration) and WSNR.

The subjective evaluation value calculator 23 calculates the subjective evaluation value on the basis of the weighted S/N ratio (WSNR) obtained from the WSNR calculator 22 and outputs it. The subjective evaluation value calculator 23 calculates the percentage of deterioration (%), that is, the relative subjective evaluation value from the deterioration percentage characteristic Z=f (WSNR) as shown in FIG. 5. This deterioration percentage characteristic Z is empirically obtained by actually using persons to be tested.

Figure 6:
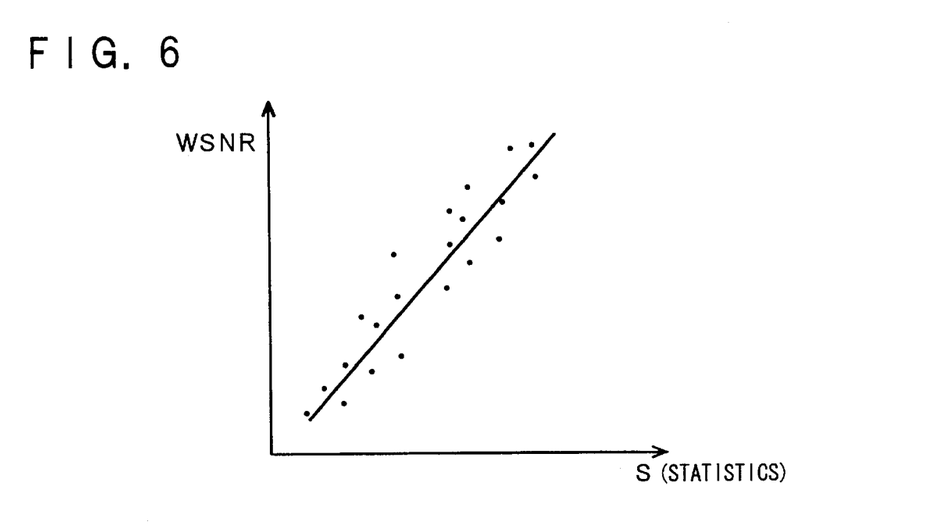
FIG. 6 is a characteristic diagram showing an example of a correlation equation to be obtained from the table.

Next, the table part 20 prepares a graph showing the correspondence of the statistics S of the reproduced image obtained from the statistics calculator 18 and the WSNR obtained from the WSNR calculator 22. For example, as shown in FIG. 6, the relationship between the statistics S and the WSNR is plotted on the graph and finally an approximate line or an approximate curve representing the relationship between the statistics S and the WSNR is obtained.

As described above, this embodiment enables to mechanically obtain the subjective evaluation value without using the persons to be tested and therefore evaluate the codec economically and quickly. In the above embodiment, the statistics calculator 18 and the table part 20 can be omitted.

Figure 7:
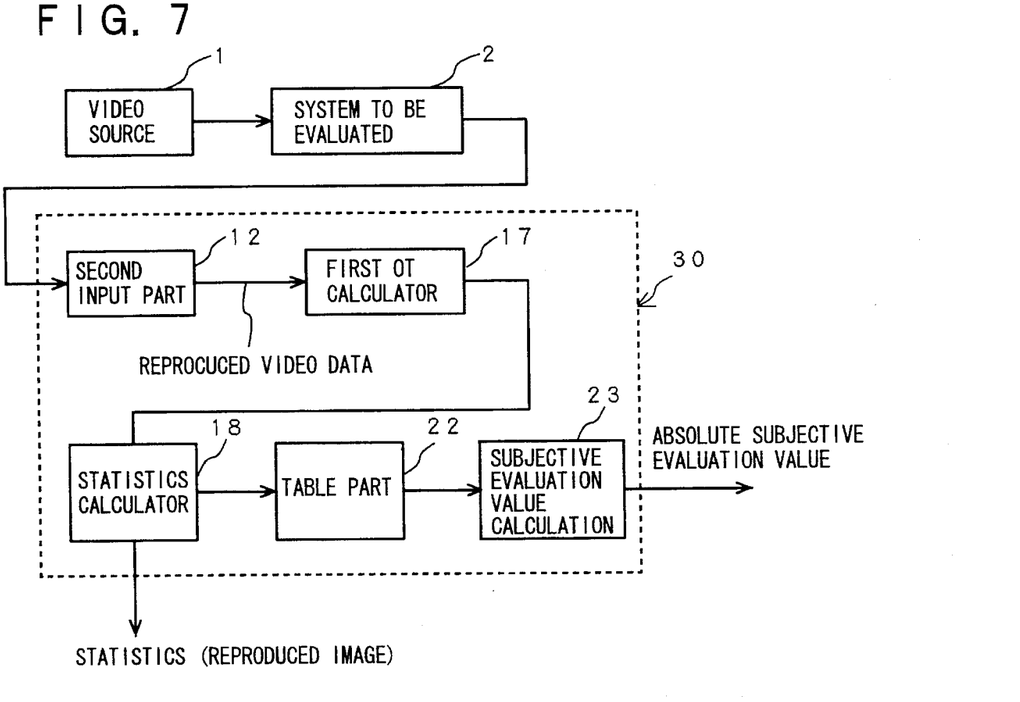
FIG. 7 is a block diagram showing a construction of the second embodiment according to the present invention.

A second embodiment according to the present invention is described below referring to FIG. 7. This embodiment is adapted to obtain an absolute subjective evaluation value by using relationship between the statistics S and the WSNR prepared by the table part 20 in the first embodiment. In FIG. 7, numeral 30 is a video quality evaluating system of this embodiment and other reference numerals denote those as same as or equivalent to the corresponding reference numerals shown in FIG. 1.

Specifically, the video quality evaluating system 30 of this embodiment comprises a second input part 20 into which a signal outputted from a system to be evaluated which is an item to be tested is entered, an OT calculator 17 for carrying out DCT transform or WHT transform of the reproduced video data from the second input part 12, a statistics calculator 18 for calculating a statistics S from the orthogonally transformed data according to the equation 1, a table part 20 having a table showing the relationship between the statistics S and the WSNR, and a subjective evaluation value calculator 23 for obtaining a deterioration percentage Z (%), that is, an absolute subjective evaluation value from the deterioration percentage characteristic Z=f (WSNR). Those data obtained in the first embodiment can be used as the data of the table part 20.

The operation in this second embodiment is described below. The codec to be tested is set as the system 2 to be evaluated and the composite TV signal and the component TV signal are supplied from the video source 1 to the corresponding codec. It is preferable that the orthogonal transform part 17 selects DCT transform for the composite TV signal and WHT transform for the component TV signal.

The reproduced video data which has been coded by the above-described codec and subsequently decoded is digitized by the second input part 12 and supplied to the orthogonal transform part 17. The orthogonal transform part 17 orthogonally transforms the reproduced video data entered and sends it to the statistics calculator 18. The statistics calculator 18 calculates the statistics S according to the equation 1. The table part 20 obtains the WSNR from the statistics S and sends the WSNR to the subjective evaluation value calculator 23. The subjective evaluation value calculator 23 similarly obtains a subjective evaluation value from Z=f (WSNR) as in the first embodiment and outputs it as the absolute subjective evaluation value.

As described above, this embodiment is advantageous in that such processing as synchronization of the original video data and the reproduced video data and subtraction of the original video data and the reproduced video data which are synchronized in the subtractor 19 as in the first embodiment can be omitted and therefore the system to be evaluated can be economically formed in a simple construction, and the processing speed can be quickened.

In FIG. 7, when the system 2 to be evaluated is deleted and the reproduced video data of the video data transmitted, for example, from a foreign country through a transmission network is directly entered as the video source 1 into the second input part 12, the quality of video data transmitted from the foreign country can be evaluated.

As known from the above description, the present invention provides an effect that the video quality evaluating tests of the digital TV codec can be conducted without the help of the persons to be tested and the video quality can therefore be evaluated economically and quickly. For example, though, in the conventional experiment-based evaluation, the labor force of approximately 100 persons/day is required for nine kinds of test data as shown in FIG. 8, the present invention enables to carry out the video quality test with the labor force of approximately one person/day.

Figure 8:
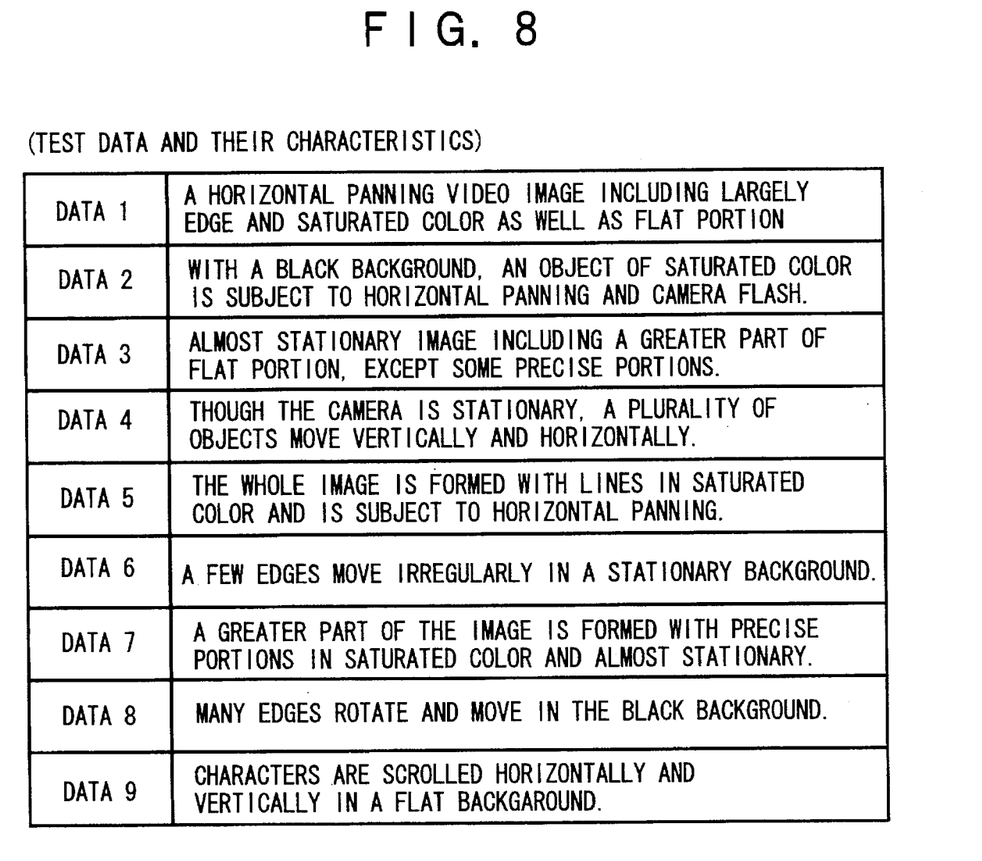
FIG. 8 is a diagram showing test data and the characteristics of the test data.

From comparison of the relative subjective evaluation value obtained by using the equipment according to the present invention and the subjective evaluation value obtained with the help of the persons to be tested as in the prior art with respect to different types of test images as shown in FIG. 8, a high accuracy of 0.85 or over is obtained as a relative coefficient. This proves that the equipment according to the present invention can be fully used.

What is claimed is:

1. A video quality evaluating equipment for a reproduced image of a video signal subject to digital compression comprising:

means for synchronizing original video data with reproduced video data obtained by reproducing said original video data after compressing the original video data;

means for orthogonally transforming a block of the original video data and the reproduced video data which are synchronized respectively;

means for calculating a difference of the same order coefficients of the orthogonally transformed video data;

means for weighting the difference with a weighting function, which varies with a position of the coefficient of the above orthogonally transformed data and a magnitude of an AC power in the block after orthogonal transform in the original image and subsequently obtaining an average weighted S/N ratio for each video frame or a plurality of video frames; and means for obtaining a value of subjective evaluation by using said weighted S/N ratio.

2. A video quality evaluating equipment for a reproduced image of a video signal subject to digital compression according to claim 1, wherein said orthogonal transform is conducted as DCT transform if said original video data are component TV signals and as WHT (Hadamard) transform if said original video data are composite TV signals.

3. A video quality evaluating equipment for a reproduced image of a video signal subject to digital compression according to claim 1, further comprising:

a statistics calculator for obtaining a mean value of AC power of one frame from said reproduced video data after orthogonal transform, and table means for obtaining a correlation of the mean value of AC power obtained from said statistics calculator and said average weighted S/N ratio and storing this correlation.

4. A video quality evaluating equipment for a reproduced image of a video signal subject to digital compression according to claim 1, wherein said reproduced video data is those video data which is digitally compressed and reproduced by the digital TV codec to be tested.

5. A video quality evaluating equipment for a reproduced image of a video signal subject to digital compression comprising:

means for orthogonally transforming reproduced video data;

a statistics calculator for obtaining a mean value of AC power for one video frame from the reproduced video data which is orthogonally transformed;

a table means for storing a correlation of said mean value of AC power and said average weighted S/N ratio, obtaining the weighted S/N ratio based on the mean value of AC power from the statistics calculator and outputting it; and a subjective evaluation value calculator for calculating the value of subjective evaluation according to said average weighted S/N ratio from said table means.

6. A video quality evaluating equipment for a reproduced image of a video signal subject to digital compression according to claim 5, wherein said reproduced video data is those video data which is digitally compressed and reproduced by the digital TV codec to be tested.

* * * * *